(12) United States Patent
Wette

(10) Patent No.: US 12,047,853 B2
(45) Date of Patent: Jul. 23, 2024

(54) METHOD AND DEVICE FOR DETERMINING A POSITION OF A VEHICLE

(71) Applicant: Robert Bosch GmbH, Stuttgart (DE)

(72) Inventor: Philip Wette, Bueckeburg (DE)

(73) Assignee: Robert Bosch GmbH, Stuttgart (DE)

( * ) Notice: Subject to any disclaimer, the term of this patent is extended or adjusted under 35 U.S.C. 154(b) by 688 days.

(21) Appl. No.: 15/734,085

(22) PCT Filed: May 24, 2019

(86) PCT No.: PCT/EP2019/063497
§ 371 (c)(1),
(2) Date: Dec. 1, 2020

(87) PCT Pub. No.: WO2020/011440
PCT Pub. Date: Jan. 16, 2020

(65) Prior Publication Data
US 2021/0223409 A1    Jul. 22, 2021

(30) Foreign Application Priority Data

Jul. 10, 2018   (DE) .......................... 102018211326.2

(51) Int. Cl.
*G01C 21/28*    (2006.01)
*H04W 4/46*    (2018.01)
(52) U.S. Cl.
CPC .............. *H04W 4/46* (2018.02); *G01C 21/28* (2013.01)
(58) Field of Classification Search
CPC ........ H04W 4/46; G01C 21/28; G01S 13/876; G01S 2013/93271; G01S 13/86; G01S 13/931; G01S 19/14; G01S 19/396; G01S 19/51; G01S 19/45; G01S 5/0072; G01S 19/42; G01S 19/40; G01S 19/48;
(Continued)

(56) References Cited

U.S. PATENT DOCUMENTS

2012/0089319 A1    4/2012  Basnayake
2012/0095674 A1*   4/2012  Lee .................... G08G 1/09675
                                                                  701/423
(Continued)

FOREIGN PATENT DOCUMENTS

CN    101221049 A    7/2008
CN    101776766 A    7/2010
(Continued)

OTHER PUBLICATIONS

International Search Report for PCT/EP2019/063497, Issued Sep. 11, 2019.

*Primary Examiner* — Bao Long T Nguyen
(74) *Attorney, Agent, or Firm* — Norton Rose Fulbright US LLP; Gerard A. Messina

(57) ABSTRACT

A method for determining a position of a vehicle. The method has a step of carrying out self-locating of the vehicle using a locating device of the vehicle in order to generate a provisional position of the vehicle. The method also has a step of reading in a position signal, the position signal representing a position of another vehicle. Moreover, the method has a step of ascertaining a relative position of the vehicle relative to the other vehicle with the aid of the position signal in order to determine the position of the vehicle using the self-locating and the relative position.

10 Claims, 3 Drawing Sheets

(58) Field of Classification Search
CPC ... G01S 2013/932; G01S 19/23; G08G 1/167; G08G 1/161; G08G 1/017
See application file for complete search history.

(56) References Cited

U.S. PATENT DOCUMENTS

2013/0335263 A1   12/2013  Schmid
2017/0345307 A1*  11/2017  Fan .......................... H04W 4/02

FOREIGN PATENT DOCUMENTS

| | | |
|---|---|---|
| CN | 102077259 A | 5/2011 |
| CN | 103874931 A | 6/2014 |
| DE | 102005029662 A1 | 1/2006 |
| DE | 102008012655 A1 | 12/2008 |
| DE | 102007054509 A1 | 5/2009 |
| DE | 102008002198 A1 | 12/2009 |
| JP | 2015114126 A | 6/2015 |
| JP | 2017096869 A | 6/2017 |
| WO | 2018053252 A1 | 3/2018 |

* cited by examiner

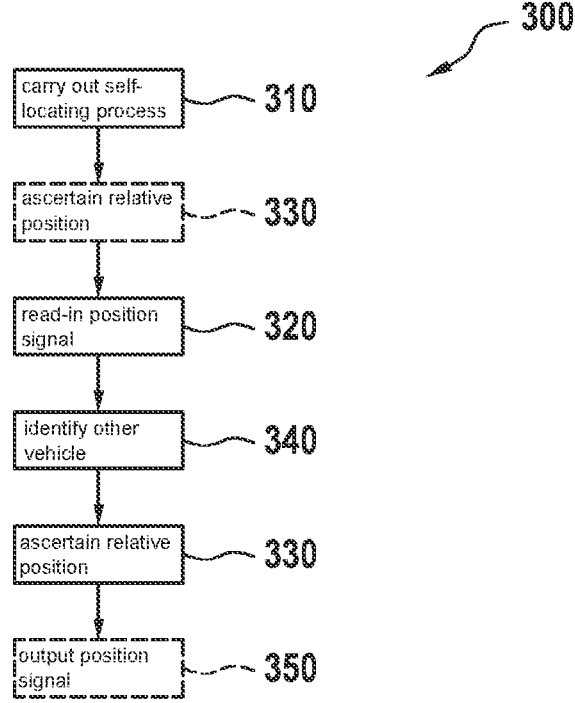
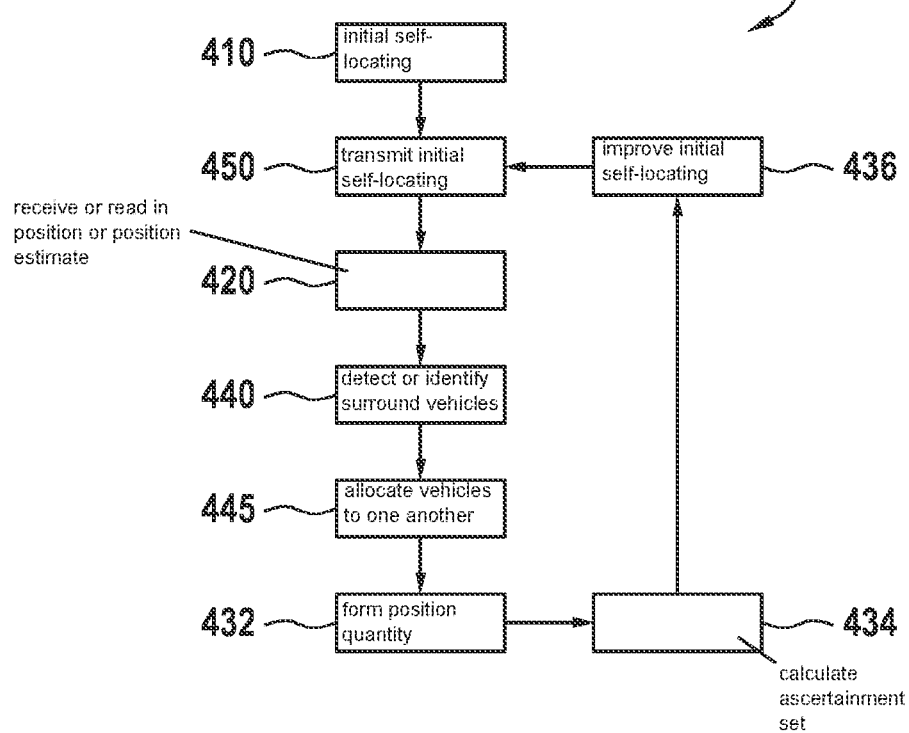

METHOD AND DEVICE FOR DETERMINING A POSITION OF A VEHICLE

FIELD

The present invention relates to a device or a method for determining a position of a vehicle. A computer program is also a subject matter of the present invention.

BACKGROUND INFORMATION

A localization of vehicles, in particular accurately down to a lane, may be of importance, especially on multi-lane roads. Signals from navigation satellites, for example, may be used for this purpose.

German Patent Application No. DE 10 2007 054 509 A1 describes a method for determining a position of a vehicle in which first information which is supplied by a position determination system and second information which is supplied by at least one stationary device and is independent of the first information can be combined.

SUMMARY

The present invention provides a method and also a device using this method, and finally also a corresponding computer program, for determining a position of a vehicle. The measures described herein allow for advantageous further developments and improvements of the device.

According to example embodiments of the present invention, an ego position of a vehicle may especially be determined in that not only self-locating of the vehicle ascertained via satellite signals takes place, but also a relative position of the vehicle ascertained on the basis of a position of another vehicle transmitted to the vehicle is used for a position determination. In other words, a method is able to be provided for the self-locating of a vehicle accurate down to a lane on a road in a digital map. Accurate down to a lane in this case particularly means that the vehicle ascertains the lane of the currently traveled road in which it is located. Vehicle-internal detection devices may be used for this purpose such as on-board satellite receivers or GNSS receivers (GNSS=global navigation satellite system), video sensors and a vehicle-to-vehicle communication (V2V communication).

According to specific example embodiments of the present invention, in particular a robustness of a self-locating accurate down to a traffic lane is advantageously able to be improved without having to use cost-intensive hardware such as dGPS (differential global positioning system) or the like. Such a lane-accurate self-locating process using GNSS and video sensors may pose various degrees of difficulty depending on the lane in which a vehicle is located and which type of a traffic situation develops, and is able to be realized in an accurate and reliable fashion according to specific embodiments. For example, the forwarding to and the use of self-locating information of other road users may be utilized for determining the traffic lane in which the ego vehicle is traveling. In particular a simple GNSS sensor, a video sensor such as a rear-view camera and additionally or alternatively a front camera as well as a V2V communications module are able to be used in the process. In addition, an on-board sensor system such as an odometer or the like can be used.

In accordance with an example embodiment of the present invention, a method is provided for determining a position of a vehicle, the method having the following steps:

Carrying out a self-locating process of the vehicle using a locating device of the vehicle in order to generate a provisional position of the vehicle;

Reading in a position signal, the position signal representing a position of another vehicle;

Ascertaining a relative position of the vehicle relative to the other vehicle with the aid of the position signal in order to determine the position of the vehicle using the self-locating and the relative position.

This example method may be implemented in software or hardware or in a mixed form of software and hardware, e.g., in a control unit. The locating device may be a GNSS receiver (GNSS=global navigation satellite system) or the like. In the step of reading in, the position signal is able to be read in via an interface with at least one other vehicle and, additionally or alternatively, an interface with a vehicle-external processing unit such as a server connected via the internet or a similar device.

According to one example embodiment of the present invention, the present method may include a step of identifying the other vehicle in environment data of an environment of the vehicle supplied by an environment sensor of the vehicle. In the step of ascertaining, the relative position is able to be ascertained with the aid of the position signal when the other vehicle is identified in the environment of the vehicle in the step of identifying. The environment sensor may be a vehicle camera, in particular a front camera or a rear-view camera of the vehicle. The vehicle camera is able to be designed as a video camera. Such an embodiment offers the advantage that an allocation of position data of other vehicles received via radio, for instance, and associated other vehicles identified via camera data is able to take place in order to ascertain a reliable and accurate relative position.

Also, in the step of reading in, a further position signal is able to be read in. The further position signal may represent a position of an additional other vehicle. In the step of ascertaining, a further relative position of the vehicle relative to the further other vehicle is able to be ascertained using the further position signal in order to determine the position of the vehicle with the aid of the self-locating process, the relative position and the further relative position. Put another way, at least one further position signal is able to be read in in the step of reading in, which may represent a position of at least one additional other vehicle, and in the step of ascertaining, at least one further relative position of the vehicle relative to the at least one further other vehicle is ascertainable using the at least one further position signal in order to determine the position of the vehicle using the self-locating process, the relative position and the at least one further relative position. Such a specific embodiment offers the advantage that a group or a set of position data may be used to further increase the accuracy of the position determination.

In the step of ascertaining, a position set may be formed featuring positions of identified other vehicles that are able to be identified in environment data of an environment of the vehicle supplied by an environment sensor of the vehicle. In the process, relative positions of the vehicle with respect to the identified other vehicles may be ascertained as well. In addition, an ascertainment set with estimated values for the position of the vehicle is able to be formed using the ascertained relative positions. Also, an aggregation of the elements of the ascertainment set may be carried out and the position of the vehicle be determined using the self-locating and the aggregation. When the aggregation is performed, a weighted center of gravity or some other type of aggregation of all elements of the ascertainment set is able to be used. Such a specific embodiment offers the advantage that the self-locating process is able to be corrected or adapted in a reliable and precise manner in order to determine the position.

According to one example embodiment of the present invention, the provisional position of the vehicle and additionally or alternatively the position of the other vehicle may include an allocated lane value pertaining to a traveled lane of a road and an allocated confidence value. The relative position also may have an allocated lane value pertaining to a traveled lane of a road and an allocated confidence value. Such a specific embodiment offers the advantage that a statement about the reliability and accuracy of a lane-accurate estimate or approximation of a position is able to be taken into account in addition.

Moreover, in the step of reading in, it is possible to read in a position signal, which represents an official number plate of the other vehicle, an optically identifiable property of or message from the other vehicle and additionally or alternatively, an operating parameter of the other vehicle for the unequivocal identification of the other vehicle. In the step of identifying, the other vehicle is able to be identified in the environment data supplied by an environment sensor of the vehicle with the aid of such a position signal. An embodiment of this type offers the advantage that a correct and reliable allocation is able to take place between position data of other vehicles received via radio, for example, and associated other vehicles identified via camera data.

The present method may also have a step of outputting a position signal to an interface with at least one other vehicle and additionally or alternatively, to a vehicle-external processing unit. The position signal may represent the provisional position of the vehicle or the determined position of the vehicle. Thus, it is possible to provide a method for cooperative, lane-accurate self-locating on the basis of video sensors and a vehicle-to-vehicle communication or the communication with a data cloud (Cloud). For instance, a cooperative character may be produced here in that multiple vehicles are able to distribute a current estimate or approximation of their self-locating to surrounding vehicles via a vehicle-to-vehicle communication or via a data cloud. These vehicles, for example, may thus be in possession of the self-determined locations of the surrounding vehicles. In addition, for instance, a vehicle is able to determine the relative positions of other vehicles in the field of view of a respective vehicle-internal camera with respect to itself.

Such relative positions determined on the basis of cameras together with the positions received via a vehicle-to-vehicle communication, for instance, are to be utilized especially in order to improve the robustness, and thus also the quality, of the self-locating and consequently of the position determination.

Furthermore, the approach presented here provides a device that is designed to execute, actuate and/or implement the steps of a variant of a method introduced here in corresponding devices. This embodiment variant of the present invention in the form of a device is likewise able to rapidly and efficiently achieve the objective on which the present invention is based.

Toward this end, the device may include at least one processing unit for processing signals or data; at least one memory unit for storing signals or data; at least one interface with a sensor or an actuator for reading in sensor signals from the sensor or for outputting data signals or control signals to the actuator; and/or at least one communications interface for reading in or outputting data, which are embedded in a communications protocol. The processing unit, for example, may be a signal processor, a microcontroller or the like, and the memory unit may be a flash memory, an EEPROM or a magnetic memory unit. The communications interface may be designed to read in or output data in a wireless and/or wire-conducted manner, in which case a communications interface, which is able to read in or output wire-conducted data, is able to read in these data, e.g., electrically or optically, from a corresponding data transmission line or output the data to a corresponding data transmission line.

A device may be understood as an electrical device in this context, which processes sensor signals and outputs control signals and/or data signals as a function thereof. The device may include an interface, which could be developed in hardware and/or software. In a hardware development, the interfaces may be part of what is known as a system ASIC, for example, which includes a wide variety of functions of the device. However, it is also possible that the interfaces are discrete, integrated switching circuits or are at least partly made up of discrete components. In a software development, the interfaces may be software modules, which are provided on a microcontroller in addition to other software modules.

In one advantageous embodiment of the present invention, the device determines a position of a vehicle. For example, toward this end, the device is able to access sensor signals such as satellite signals from a satellite receiver, environment data from an environment sensor, or more specifically, image data from a vehicle camera, and position signals from other vehicles, in particular. A lane-accurate position determination is able to be carried out. The determined position of the vehicle is able to be made available in the form of an ego position signal for the output via an interface to further vehicle devices. Such further vehicle devices may require the determined position of the vehicle and additionally or alternatively, use it to realize vehicle functions, assistance functions and others.

Also advantageous is a computer program product or a computer program having program code stored on a machine-readable carrier or a memory medium such as a semiconductor memory, a hard disk memory or an optical memory and used for carrying out, implementing and/or actuating the steps of the method as recited in one of the afore-described example embodiments, in particular when the program product or the program is executed on a computer or a device.

Exemplary embodiments of the present invention are shown in the figures and described in greater detail below.

BRIEF DESCRIPTION OF THE DRAWINGS

FIG. 3 shows a flow diagram of a method for determining according to an exemplary embodiment of the present invention.

FIG. 4 shows a flow diagram of a position determination process according to an exemplary embodiment of the present invention.

DETAILED DESCRIPTION OF EXAMPLE EMBODIMENTS

Figure 1:
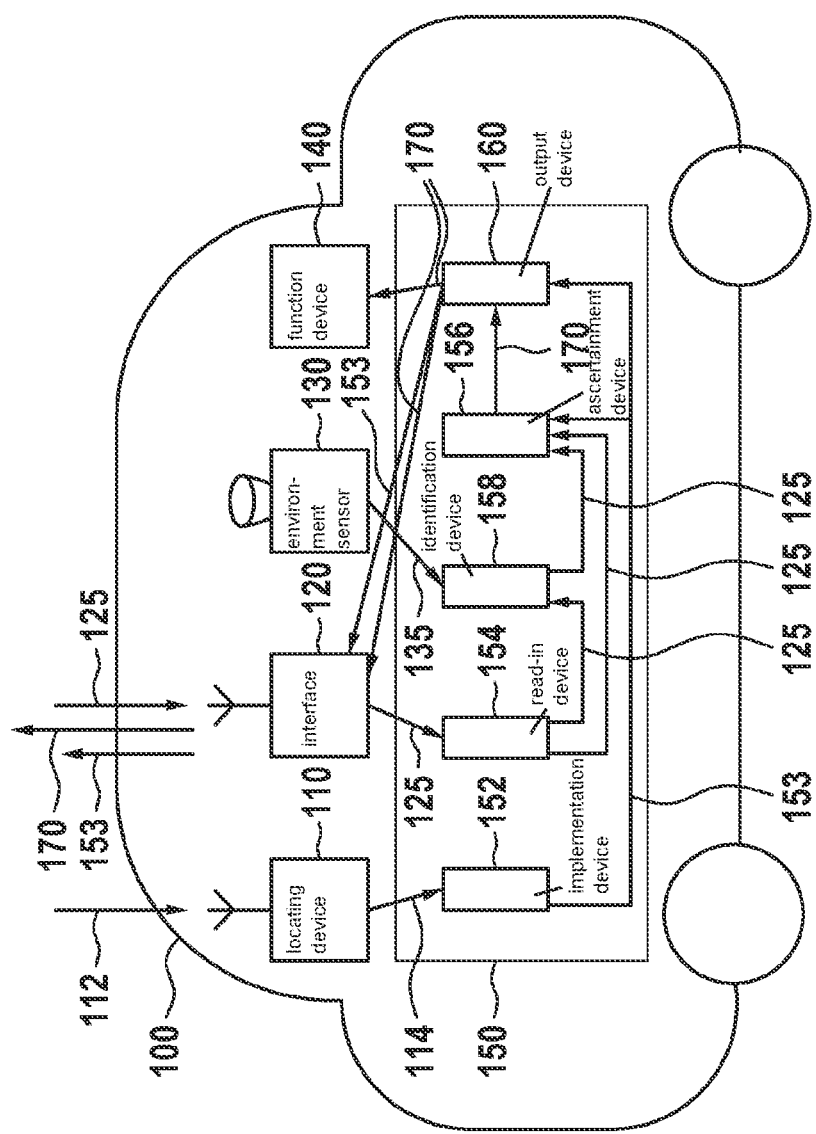
FIG. 1 show a schematic illustration of a vehicle having a device according to an exemplary embodiment of the present invention.

In the following description of advantageous exemplary embodiments of the present invention, identical or similar reference numerals are used for the elements that are shown in the various figures and have a similar effect, and a repeated description of these elements has been omitted.

FIG. 1 shows a schematic representation of a vehicle 100 having a device 150 according to an exemplary embodiment of the present invention. Vehicle 100 is a motor vehicle, in particular a passenger car, a truck or some other industrial vehicle. Device 150 is designed to determine a position of vehicle 100, in particular precisely down to the lane. Device 150 is also denoted as determination device 150 in the following text. Device 150 according to this exemplary embodiment is located in vehicle 100.

In addition to determination device 150, vehicle 100 according to the exemplary embodiment illustrated here also includes a locating device 110 such as in the form of a satellite receiver for satellite signals; an interface 120, exemplarily only one environment sensor 130 such as in the form of a vehicle camera, and exemplarily only one function device 140 for implementing a vehicle function, an assistance function and/or the like.

Locating device 110, interface 120, environment sensor 130, and function device 140 are connected to determination device 150 in a manner that allows for a signal transmission. Determination device 150 has an implementation device 152, a read-in device 154, and an ascertainment device 156. According to the exemplary embodiment shown here, determination device 150 also has an identification device 158 and an output device 160.

Below, an operation of determination device 150 as well as of further involved devices of vehicle 100 for determining the position of vehicle 100 are described.

Locating device 110 is designed to receive a satellite signal 112 from a navigation satellite. In addition, locating device 110 is designed to generate a locating signal 114 with the aid of satellite signal 112 and to forward it to implementation device 152 of determination device 150. Implementation device 152 is designed to perform a self-locating process of vehicle 100 using locating device 110 or more specifically, using locating signal 114, in order to generate a provisional position of vehicle 100. In addition, implementation device 152 is designed to forward a provisional ego-position signal 153, which represents the provisional position of vehicle 100, to ascertainment device 156.

Interface 120 is developed as a radio interface for the bidirectional transmission of signals, for example. Interface 120 is designed to receive a position signal 125, which represents a position of another vehicle. More specifically, interface 120 is designed to receive position signal 125 from the other vehicle and/or from a vehicle-external processing device such as a server connected via the internet. In addition, interface 120 is designed to supply position signal 125 to read-in device 154 of determination device 150. Read-in device 154 is designed to read in position signal 125 or to read it in from interface 120. Moreover, read-in device 154 is designed to forward position signal 125 to ascertainment device 156.

Ascertainment device 156 is designed to ascertain a relative position of vehicle 100 relative to the other vehicle with the aid of position signal 125 in order to determine the position of vehicle 100 based on provisional ego-position signal 153 or the self-locating and the relative position. Moreover, ascertainment device 156 is designed to generate and supply an ego-position signal 170, which represents the position of vehicle 100.

According to one exemplary embodiment of the present invention, environment sensor 130 is developed to detect, especially optically detect, an environment of vehicle 100. Environment sensor 130 is designed to generate environment data 135 representing a detected environment of vehicle 100, and to forward the data to identification device 158 of determination device 150, among others. Identification device 158 is designed to identify the other vehicle in environment data 135. Identification device 158 is designed to receive position signal 125 from read-in device 154 and to forward it to ascertainment device 156 only if the other vehicle was or is identified in environment data 135 or in the environment of vehicle 100. Ascertainment device 156 thus is designed to ascertain the relative position with the aid of position signal 125 if the other vehicle was identified in the environment of vehicle 100.

According to one exemplary embodiment of the present invention, output device 160 of determination device 150 is designed to output provisional ego-position signal 153 or ego-position signal 170 to interface 120 for a transmission to the other vehicle and/or the vehicle-external processing device. In addition, output device 160 according to one exemplary embodiment is designed to output ego-position signal 170 to function device 140. Function device 140 is designed to implement or provide the vehicle function, assistance function and/or the like using ego-position signal 170.

According to one exemplary embodiment of the present invention, the provisional position of vehicle 100 represented in provisional ego-position signal 153, the position of the other vehicle represented in position signal 125, and/or the position of vehicle 100 represented in ego-position signal 170, include(s) an allocated lane value with regard to a traveled lane of a road and an allocated confidence value. This makes it possible to carry out a cooperative and lane-accurate position determination. With the aid of the confidence value, the individually determined positions of vehicle 100 and the other vehicle are easily able to be evaluated with regard to their reliability.

Although not explicitly illustrated in FIG. 1, read-in device 154 according to one exemplary embodiment is designed to read in a further position signal 125 or a plurality of position signals 125. Every further position signal 125 represents a position of a further other vehicle. Ascertainment device 156 is designed to ascertain a further relative position of vehicle 100 relative to the further other vehicle with the aid of further position signal 125 or a plurality of relative positions of vehicle 100 relative to the plurality of other vehicles in order to determine the position of vehicle 100 using the self-locating, the relative position and the further relative position or the plurality of relative positions.

With the aid of one or a plurality of satellite signal(s) 112, one or more environment sensor(s) 130, and one or more communications system(s), lane-accurate self-locating of vehicle 100 is able to be carried out.

According to one exemplary embodiment of the present invention, a transmission of signals 125, 153 and 170 between vehicle 100 and the at least one other vehicle is carried out via a local vehicle-to-vehicle communication. As an alternative, the signal transmission may be carried out via a backend-supported system in that the corresponding data or the data are transmitted to a server, e.g., via mobile telephony. The server then further distributes the data to other road users or other vehicles as appropriate under the circumstances in the manner it is done in a so-called geo-cast.

According to one exemplary embodiment of the present invention, an allocation of at least one other vehicle on a communications channel to environment data 135, in particular a video image, is able to be facilitated in the following manner. Different supplementary methods are able to be used for allocating other vehicles that have been identified in environment data 135 to other vehicles that can be heard on the communications channel or whose position signals 125 are received. Other vehicles may provide their official number plate, e.g., via a radio channel. However, it is also possible that a light source for visible or invisible light is mounted on another vehicle, which periodically emits a sequence based on which the other vehicle is able to be identified. The same sequence may also be emitted on the communications channel so that an allocation is able to take place. Also possible in this context are additional supplementary methods by which trajectories and acceleration values of at least one other vehicle are transmitted via the radio channel and are then compared to the values estimated via environment data 135 so as to achieve an allocation in this manner.

Figure 2:
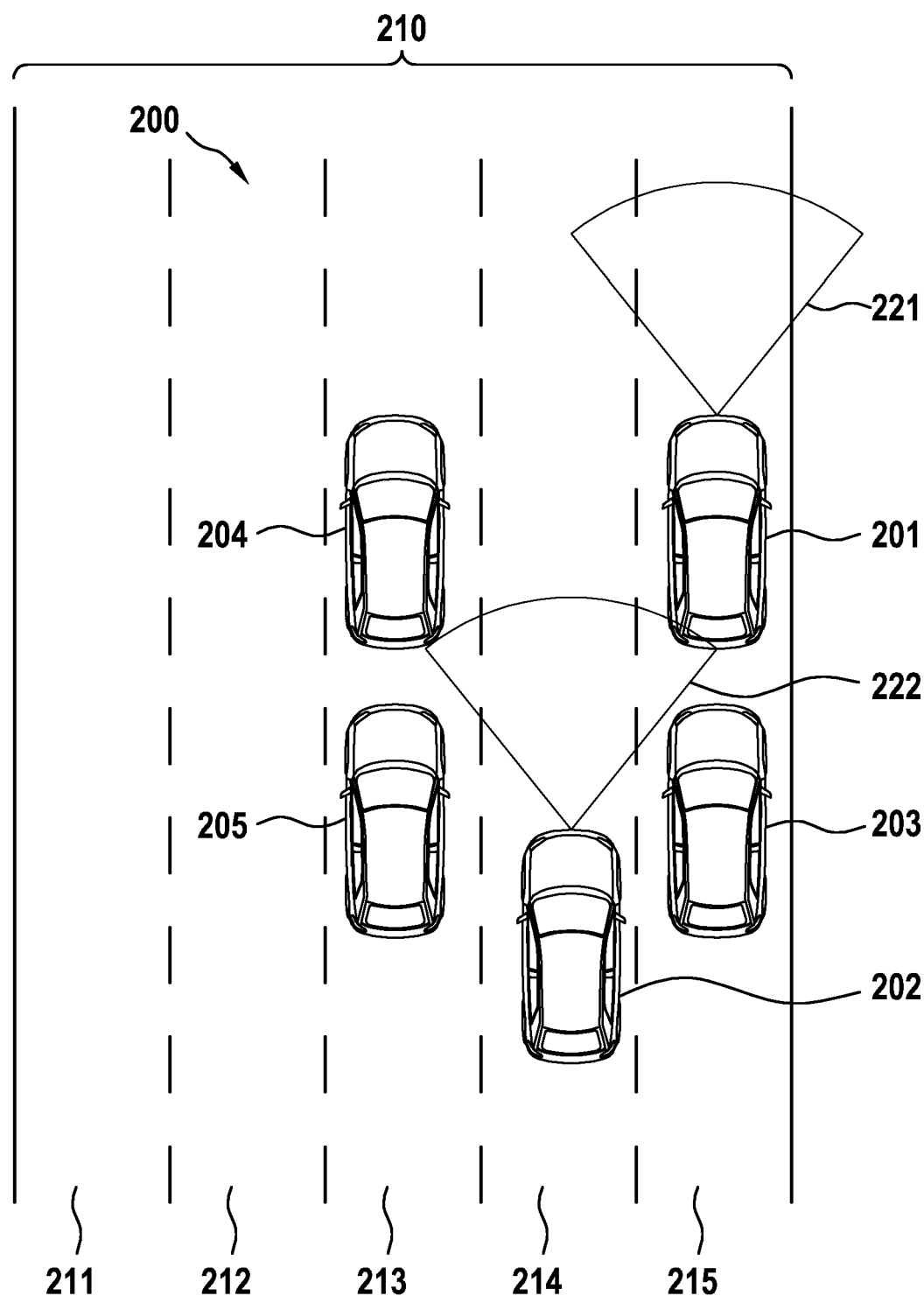
FIG. 2 shows a schematic illustration of a traffic situation.

FIG. 2 shows a schematic representation of a traffic situation 200. Five vehicles 201, 202, 203, 204, 205 are involved in traffic situation 200 by way of example and are located on a road 210 having five lanes 211, 212, 213, 214, 215 merely by way of example or are distributed among traffic lanes 211, 212, 213, 214, 215. A first vehicle 201, also denoted as vehicle V1, and a third vehicle 203 travel in a fifth lane 215 all the way to the right on road 210. A second vehicle 202, also denoted as vehicle V2, travels in a fourth lane 214 to the left next to fifth lane 215. A fourth vehicle 204 and a fifth vehicle 205 travel in a third lane 213 to the left next to fourth lane 214.

With the aid of an environment sensor, e.g., a camera having a field of view 222, second vehicle 202 can see only other vehicles in lane 110, more precisely, only fourth vehicle 204 and first vehicle 201. This alone is not enough for a lane-accurate locating. First vehicle 201 has an unimpeded view via its environment sensor, e.g., a camera having a field of view 221, and is therefore able to carry out a lane-accurate self-locating process. First vehicle 201 can see a right boundary strip with the aid of its camera. In addition, a curbstone, a guardrail or a fence to the right next to fifth traffic lane 215 may possibly be detected. This may allow for a lane-accurate self-locating process of first vehicle 201 on the basis of the camera or a video sensor under these circumstances.

Let it be assumed that second vehicle 202 is located in the center lane of a five-lane road featuring slow-moving traffic. With the aid of the video sensor, this vehicle is able to detect only further traffic lanes and additional vehicles to the left and right, but on the basis of this information is unable to robustly ascertain whether it is located in the second, third or fourth lane. The environment sensors may be front cameras, rear-view cameras or a combination of front and rear-view cameras.

If at least two of vehicles 201, 202, 203, 204, 205 correspond or are similar to the vehicles from FIG. 1, each such vehicle is able to carry out a lane-accurate position determination.

For example, if second vehicle 202 has a determination device as it is described in FIG. 1, and if first vehicle 201 has a device for transmitting its current position to second vehicle 202, then the determination device of second vehicle 202 is able to perform a position determination as described on the basis of FIG. 1.

This is possible because second vehicle 202 is able to identify first vehicle 201 with the aid of its video sensor. In the illustrated situation, first vehicle 201 is driving in the right lane in relation to second vehicle 202 when viewed from second vehicle 202. Via a vehicle-to-vehicle communication, for example, first vehicle 201 is able to inform second vehicle 202 that first vehicle 201 is located on the outermost right traffic lane, i.e. in fifth lane 215. Second vehicle 202 may then conclude that it is located in the second outermost right lane of five lanes, i.e., in fourth lane 214.

FIG. 3 shows a flow diagram of a method 300 for determining according to one exemplary embodiment. Method 300 is able to be carried out in order to determine a position of a vehicle. Method 300 for determining is executable in conjunction with or with the aid the device or determination device from FIG. 1 or a similar device. In addition, method 300 for determining is able to be carried out in conjunction with the vehicle from FIG. 1 or a similar vehicle.

In method 300 for determining, a self-locating process of the vehicle is carried out in a step 310 of executing using a locating device of the vehicle in order to generate a provisional position of the vehicle. Hereinafter, in a step 320 of reading in, a position signal is read in. The position signal represents a position of another vehicle. A step 330 of ascertaining is then carried out in which a relative position of the vehicle relative to the other vehicle is ascertained with the aid of the position signal in order to determine the position of the vehicle using the self-locating and the relative position.

According to one exemplary embodiment of the present invention, method 300 for determining also has a step 340 of identifying the other vehicle in environment data of an environment of the vehicle provided by an environment sensor of the vehicle. Step 340 of identifying is able to be carried out between step 320 of reading in and step 330 of ascertaining. In step 330 of ascertaining, the relative position is ascertained with the aid of the position signal when the other vehicle is identified in the environment of the vehicle in step 340 of identifying. According to one exemplary embodiment of the present invention, method 300 for determining furthermore has a step 350 of outputting a position signal to an interface with at least one other vehicle and/or with a vehicle-external processing unit. The position signal represents the provisional position of the vehicle or the determined position of the vehicle. Step 350 of outputting is able to be carried out after step 310 of executing and/or after step 330 of ascertaining.

FIG. 4 shows a flow diagram of a position determination process 400 according to an exemplary embodiment of the present invention. Position determination process 400 is able to be executed in connection with the method from FIG. 3 or within the framework of the method from FIG. 3. In position determination process 400, initial self-locating $P_{V_o} = (s,k)$ takes place or is found in block 410. Next, in a second block 450, the initial self-locating $P_{V_o}$ is transmitted to surrounding vehicles or other vehicles. In a third block 420, at least one position or a position estimate $P_{V_i}$ of at least one other vehicle is received or read in. In a fourth block 440, surrounding other vehicles are subsequently detected and/or identified via video. In a fifth block 445, optically or visually detected vehicles and vehicles on the communications channel are then allocated to one another. Next, in a sixth block 432, a position set or set $\mathcal{P}$ featuring positions of identified other vehicles is formed.

Then, in a seventh block 434, an ascertainment set or set $\varepsilon$ is calculated, relative positions of the vehicle relative to the identified other vehicles being ascertained for the ascertainment set or set $\varepsilon$, and the ascertainment set or set $\varepsilon$ featuring estimated values for the position of the vehicle being formed using the ascertained relative positions. In an eighth block

436, the initial self-locating $P_{V_o}$ is improved by aggregating the elements from the ascertainment set or set ε.

However, a lane-accurate position estimate $P_{V_i}=(s,k)$ of a vehicle $V_i$ consists of lane s and a confidence value k for the estimate in each case. The operand lane outputs the corresponding lane for a position estimate, and the operand conf outputs the confidence of the estimate. In first block 410, an initial self-locating $P_{V_o}=(s,k)$ in lane s is carried out on the basis of an onboard sensor system of the vehicle or ego vehicle $V_o$ and is annotated by a situation-dependent confidence value k. Then, in second block 450, $P_{V_o}$ is distributed via vehicle-to-vehicle communication to all other vehicles in the transmission range of the communications system. They in turn receive position estimates $P_{V_i}$ for all surrounding vehicles $V_i$.

In third block 420, received position estimates $P_{V_i}$ are compared to the vehicles $V_i$ located in the field of view of the camera of ego vehicle $V_0$. All position estimates that are unable to be allocated to any visually observed other vehicle are discarded at this point. The set of the remaining position estimates is denoted as position set or set $\mathcal{P}=\{P_{V_1}, \ldots, P_{V_n}\}$ By evaluating environment data or image data or video images, it is possible to determine for each remaining estimate $P_{V_i} \in \mathcal{P}$ the relative position $P_{V_o}^{V_o}=(s,k)$ of the vehicle or ego vehicle $V_0$ relative to another vehicle $V_i$. These relative positions are also made up of a lane deviation s and a confidence value k. For each element of this position set $\mathcal{P}$, the vehicle, i.e. ego vehicle $V_0$ thus has knowledge both of the relative position of the corresponding vehicle, i.e. other vehicle relative to the vehicle or ego vehicle $V_o$ and its self-locating including the confidence.

Based on the position set $\mathcal{P}$, ascertainment set $\varepsilon=\{e_1=(s_1k_1), \ldots, e_n=(s_nk_n)\}$ of the new estimates for the self-locating is calculated by forming for each estimate $P_{V_i} \in \mathcal{P}$ a new candidate for the self-locating $e_i=(\text{lane}(P_{V_i})+\text{lane}(P_{V_i}^{V_o}), \text{conf}(P_{V_i})\cdot\text{conf}(P_{V_i}^{V_o}))$. From the ascertainment set $\varepsilon \cup \{P_{V_o}\}$, the new lane-accurate self-location $P_{V_o}$ is then able to be calculated in eighth block 436, for instance by calculating the center of gravity of all elements of the set weighted by the confidence value. However, other methods for aggregating the elements of set $\varepsilon \oplus \{P_{V_o}\}$ are possible as well in this context.

If an exemplary embodiment includes an "and/or" linkage between a first feature and a second feature, then this is to be understood to denote that the exemplary embodiment according to one specific embodiment includes both the first feature and the second feature, and according to a further embodiment includes either only the first feature or only the second feature.

What is claimed is:

1. A positioning method for an ego vehicle, the method comprising the following steps:
   carrying out a self-locating process of the ego vehicle using a locating device of the ego vehicle to generate a provisional position of the ego vehicle;
   reading in, from each of a plurality of other vehicles in a surrounding environment of the ego vehicle, a respective position signal representing a respective other provisional position, which is of the respective other vehicle;
   comparing the other provisional positions to observations of the surrounding environment to identify which of the vehicles from which the position signals representing the other provisional positions have been read-in are matched to vehicles observed in the surrounding environment by the sensor system, the observations being by a sensor system of the ego vehicle;
   based on the identification, determining a set of estimates of which of a plurality of lanes is a present lane in which the ego vehicle is currently traveling, wherein each of the estimates is based on a relative position of the ego vehicle relative to a respective one of the identified vehicles; and
   identifying one of the plurality of lanes as an actual lane in which the ego vehicle is currently traveling based on a combination of the set of estimates.

2. The positioning method as recited in claim 1, wherein each of the provisional position of the ego vehicle and the other provisional positions of the plurality of other vehicles includes a respective identification of a respective one of the plurality of lanes and a respectively allocated confidence value defining a respective confidence in a correctness of the respective identification of the respective one of the lanes.

3. The positioning method as recited in claim 1, further comprising, for each of the read in position signals, reading in a respective number of a plate of the respective one of the other vehicles from which the respective position signal was read in, wherein the comparing includes comparing each of the read-in numbers to plate numbers identified by the sensor system.

4. The positioning method as recited in claim 1, further comprising:
   outputting, via an interface, an ego position signal to at least one other vehicle and/or to a vehicle-external processing unit, the position signal representing the identified one of the plurality of lanes.

5. The positioning method as recited in claim 1, wherein:
   each estimate of the set of estimates includes a respective identification of one of the plurality of lanes as the present lane and a respective confidence score of the respective identification of the respective estimate; and
   the identifying of the actual lane based on the combination of the set of estimates includes calculating the actual lane based on the set of estimates, each of the estimates being weighted in the calculation according to its respectively associated confidence score.

6. The positioning method as recited in claim 5, wherein the calculating is of a center of gravity of the set of estimates.

7. The positioning method as recited in claim 1, further comprising, for each of the read in position signals, reading in a property of the respective one of the other vehicles from which the respective position signal was read in, wherein the comparing includes comparing each of the read-in properties to properties identified by the sensor system.

8. The positioning method as recited in claim 1, further comprising:
   outputting, via an interface, a position signal to at least one other vehicle and/or to a vehicle-external processing unit, the position signal representing the generated provisional position of the ego vehicle.

9. A device of an ego vehicle, the device comprising a processor, wherein the processor is configured to:
   carry out a self-locating process of the ego vehicle using a locating device of the ego vehicle to generate a provisional position of the ego vehicle;
   read in, from each of a plurality of other vehicles in a surrounding environment of the ego vehicle, a respective position signal representing a respective other provisional position, which is of the respective other vehicle;
   compare the other provisional positions to observations of the surrounding environment to identify which of the vehicles from which the position signals representing the other provisional positions have been read-in are matched to vehicles observed in the surrounding environment by the sensor system, the observations being by a sensor system of the ego vehicle;

based on the identification, determine a set of estimates of which of a plurality of lanes is a present lane in which the ego vehicle is currently traveling, wherein each of the estimates is based on a relative position of the ego vehicle relative to a respective one of the identified vehicles; and identify the one of the plurality of lanes as an actual lane in which the ego vehicle is currently traveling based on a combination of the set of estimates.

10. A non-transitory machine-readable memory medium on which is stored a computer program for determining a positioning method of an ego vehicle, the computer program, when executed by a computer, causing the computer to perform the following steps:

carrying out a self-locating process of the ego vehicle using a locating device of the ego vehicle to generate a provisional position of the ego vehicle;

reading in, from each of a plurality of other vehicles in a surrounding environment of the ego vehicle, a respective position signal representing a respective other provisional position, which is of the respective other vehicle;

comparing the other provisional positions to observations of the surrounding environment to identify which of the vehicles from which the position signals representing the other provisional positions have been read-in are matched to vehicles observed in the surrounding environment by the sensor system, the observations being by a sensor system of the ego vehicle;

based on the identification, determining a set of estimates of which of a plurality of lanes is a present lane in which the ego vehicle is currently traveling, wherein each of the estimates is based on a relative position of the ego vehicle relative to a respective one of the identified vehicles; and identifying the one of the plurality of lanes as an actual lane in which the ego vehicle is currently traveling based on a combination of the set of estimates.

* * * * *